July 20, 1926.
H. Z. CUTLER
AUTOMOBILE RADIATOR
Filed Nov. 23, 1922
1,593,245
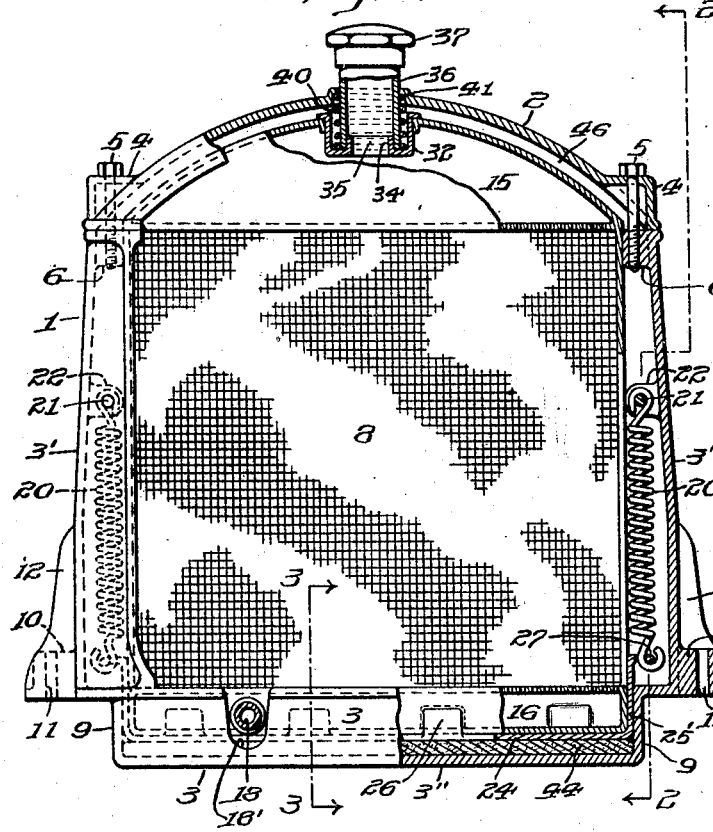
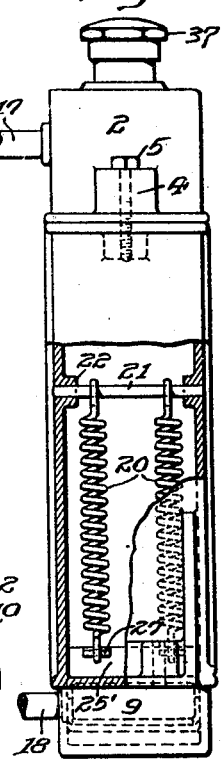
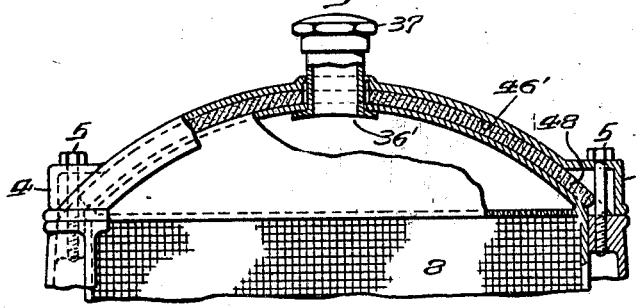
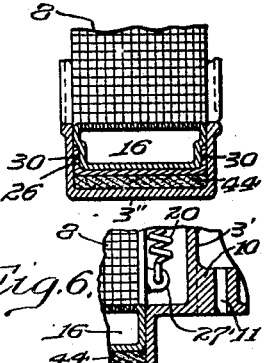
INVENTOR
Herman Z. Cutler
WITNESS
ATTORNEYS Patented July 20, 1926.

1,593,245

UNITED STATES PATENT OFFICE.

HERMAN Z. CUTLER, OF CAMDEN, NEW JERSEY, ASSIGNOR TO CUTLER AUTO RADIATOR COMPANY, A CORPORATION OF NEW JERSEY.

AUTOMOBILE RADIATOR.

Application filed November 23, 1922. Serial No. 602,689.

A principal object of my invention is to provide an automobile radiator comprising a water cooling core and a casing or housing therefor made up of separable sections so arranged that by the removal of one of said sections the core may be readily withdrawn from the casing for repair, replacement or renewal.

A further object of my invention is to provide means for resiliently or yieldingly supporting the core within the casing in such manner as to protect the core from damage by jars, shocks or strains incident to the operation of the automobile and to permit slight relative movement between the core and the casing when required.

A still further object of the invention is to provide a radiator for automobiles the parts of which may be readily standardized in manufacture thereby permitting a damaged or worn part to be replaced by a new part either temporarily or permanently without requiring the replacement of the radiator in its entirety as is frequently the case in radiators of unit construction.

My invention further includes all of the other objects and novel features of construction and arrangements hereinafter more definitely specified or which will appear from the accompanying drawing forming a part hereof.

As the principles of my invention may be readily adapted to radiators having different structural forms and intended for use on pleasure cars as well as on the heavier forms of automotive vehicles such as trucks, it will be understood that the employment of the invention is not confined to any specific type or style of radiator or to a radiator intended for use on any particular style of vehicle, but as the invention is particularly applicable to the heavier types of radiators ordinarily utilized on trucks and the like, I have illustrated in the accompanying drawing and will now proceed to describe a radiator generally of such type and embodying one form of my invention.

Referring to the said drawing, Fig. 1 is a rear elevation of the radiator with certain portions broken away into vertical section; Fig. 2 is a view partially in section and partially in elevation on line 2—2 in Fig. 1 looking in the direction of the arrows, and Fig. 3 is a fragmentary vertical section on line 3—3 in Fig. 1 also looking in the direction of the arrows. Fig. 4 is a top plan view on a reduced scale of one of the parts employed in the preferred embodiment of the device showing the same in its initial form and prior to its being bent up into final form, and Fig. 5 is a fragmentary view generally similar to Fig. 1 but only showing the upper part of the radiator and illustrating a slightly modified form of the invention. Fig. 6 shows a modified construction in which a separate cradle is omitted. Like numerals are used to designate the same parts in the several figures.

Referring now more particularly to the form of the invention illustrated in Figs. 1 to 4 inclusive, the shell or casing 1 of the radiator may be formed with an upper section 2 and a lower section 3, the former being provided with lugs 4 drilled for the passage of bolts 5 which extend through the lugs and into the other lugs or projections 6 disposed near the upper edge of the lower section, the bolts thereby serving to clamp the sections together when in assembled position. The sections of the casing may be made of cast metal in the manner illustrated or in certain constructions may be made of sheet metal stamped or otherwise formed to requisite shape, and both of the sections are preferably so designed as to present a generally channel-shaped cross section at substantially any given point thus affording a suitable channel for the reception of the core, generally designated as 8, so that when the core is positioned in the casing as hereinafter more fully described, the edges or flanges of the latter will generally overhang the periphery of the core on both the front and rear faces thereof so as to assist in retaining the core in upright position.

More particularly the lower section of the casing may comprise vertically extending side members 3' of channel section and a conveniently integral, transversely extending bottom member 3" also of channel section and having transversely disposed ends 9, the several channels being adapted to receive the edges of the core which fits freely therein so as to be capable of slight relative movement with respect to the casing when required. In a similar manner, the upper section 2, which may be of any form suitable for housing the upper part of the core which in the present instance is shown as comprising a curved upper surface, is also preferably of channel section with the open side of the channel directed downwardly, the channel being of sufficient depth so that when the upper section is assembled on the lower section and the core disposed therein, the edges of the upper section will slightly overlap the upper edge of the core. Preferably, those portions of the sections which overlap the core as well as the inner faces of the lugs 6 if of sufficient thickness to contact with the core as shown, may be machined or otherwise finished with a smooth surface when the parts are made of cast metal so as to facilitate any slight movement of the core with respect thereto.

Suitable means may also be provided for effecting attachment of the casing to the frame of the automobile, said means conveniently comprising one or more lugs 10 disposed at the sides of the section 3, laterally extending therefrom and provided with bolt holes 11, vertically extending strengthening ribs 12 being also arranged at the sides of the lower part of the casing if desired.

In the particular radiator illustrated, the core 8 is of unitary construction and of the well known honeycomb type, and is provided with an integral header tank 15 above the central honeycomb portion and an outlet tank 16 therebelow, these tanks being respectively provided with inlet and outlet connections 17 and 18, a recess 18' being conveniently arranged in the rear wall of the transverse member 3'' to accommodate the water outlet. Under operative conditions these outlets are suitably connected to the motor of the automobile in the well known manner.

Means are provided for yieldingly or resiliently supporting the core within the sectional casing, said means comprising coil springs interposed between the core and the side members of the casing and supported from the latter in such manner that the weight of the core is borne by the springs and the core thus rendered capable of relative vertical movement with respect to the casing.

More particularly, I effect support for the core through a plurality of substantially vertically disposed coil springs 20 preferably disposed at the sides of the core and in the channels of the side members 3' of the lower section of the casing, and while I may for this purpose utilize any desired number of springs, I prefer to employ a pair of springs on each side of the core and to attach their upper extremities in spaced relation to a suitable support carried by the casing and which may conveniently comprise a horizontally disposed rod or bolt 21 extending through the casing from front to rear and operatively fixed therein at a suitable height. If desired, small lugs 22 may be formed on the inside of the walls of the side members so as to afford a more rigid support for the ends of the bolt than would otherwise be the case, and for preventing longitudinal displacement of the bolt the same may be provided at one end with a head and at the other with a nut which is screwed into place after the bolt is inserted through the casing.

In the preferred embodiment of the invention I connect the opposite or lower ends of the springs to a suitable cradle 24 designed to receive the lower part of the core and support the same, and while this cradle may be of any form or construction suitable for accomplishing its intended function, it may conveniently be made from a blank of sheet metal of the form illustrated in Fig. 4. This blank consists of a main body portion 25 of suitable length and preferably of the same width as the thickness of the core from front to back; from the side edges of the body may be laterally extended a plurality of longitudinally spaced ears 26 and from the end edges a plurality of laterally spaced ears 27 provided with holes 28 for the reception of the ends of the springs. The blank having been cut out in the form described, the ears 26 are bent up at right angles to the body of the blank and the end portions 25' of the body also bent up at right angles thereto substantially along the dotted lines shown in Fig. 4, so that the distance between the vertically disposed end portions 25' will be such that the core may be snugly disposed therebetween, after which the ears 27 may be turned outwardly into horizontal position.

For the purpose of accommodating the ears 26, the side walls of that portion of the core forming the outlet tank 16 may be suitably indented as at 30 (see Fig. 3) at spaced intervals so as to provide depressions for the reception of the ears in such manner that when the core is positioned in the cradle the outer surface of the ears will lie flush with the front and back of the core, while the end portions 25' of the cradle will lie snugly but freely between the ends 9 of the transverse member 3'' and at the sides of the core extending upwardly along the same for a suitable distance. Thus, the cradle is adapted to receive and afford vertical support to the core while by reason of the engagement of the ears 26 and end portions 25' therewith, the core is prevented from relative movement with respect to the cradle and the latter restrained from endwise movement with respect to the casing by the ends 9 of the transverse member 3''. It will be understood, however, that the specific construction of the cradle may be materially modified from the preferred embodiment which I have described, for example, by connecting the ears 26 so as to provide continuous flanges at the sides of the cradle, or in certain constructions, if desired, by entirely omitting the flanges and ears.

For centering and yieldingly supporting the upper part of the core within the shell or casing, I preferably provide at the center of the upper part of the core a spring receiving cup 32, the major portion of which is disposed within the tank 15. This cup may be provided with a central upwardly directed flange 34 surrounding a filling passage 35 communicating with the tank and adapted to receive the lower end of the filler pipe 36 which extends upwardly through the shell and carries the usual cap 37 the lower end of this pipe being soldered or otherwise suitably secured to the flange. The opening in the casing through which the pipe extends is preferably of sufficient diameter to permit the latter to move freely vertically therein while still affording lateral support to the pipe, and surrounding the filler pipe and disposed within the cup is a coil spring 40 of suitable strength, one end of which rests on the bottom of the cup and the other on the under side of the casing which may be conveniently suitably formed at this point to snugly receive the spring as at 41.

With the several parts constructed substantially in the manner described, the radiator is assembled with the lower part of the core disposed in the cradle, the lower ends of the springs 20 attached to the ears 27 and the upper ends thereof supported on the bolts 21, the springs being thus disposed in laterally spaced relation at the sides of the core and within the channels formed in the vertical sections 3' of the casing. Preferably the springs 20 are of such strength that when the core is supported in the casing the bottom of the cradle is maintained in slightly spaced relation with the bottom of the transverse member 3", and a piece of felt or other resilient material 44 may preferably be disposed in the channel of the said transverse member beneath the cradle so as to fill or substantially fill the space therebetween. The upper section 2 of the casing being secured in place by the bolts 5 with the spring 40 disposed about the filler pipe, the core is thus yieldingly or resiliently supported within the casing in such manner as to be capable of slight vertical movement with respect thereto, the respective heights of the core and of the interior of the casing being preferably so proportioned that a small space or clearance 46 is left between the upper end of the core and the under side of the upper section 2 of the casing so that slight upward movement of the core from normal position can take place without the core coming into contact with the upper section of the casing.

In the form of the invention shown in Fig. 5, the cup 32 and spring 40 are omitted, the filler pipe 36' being soldered into the upper part of the tank and arranged to extend freely upwardly through an aperture in the casing of suitable diameter to steady the pipe but allow its vertical movement when required, and under these conditions I prefer to dispose within the space 46' between the casing and the upper part of the core a pad 48 of felt or other resilient material which is adapted to afford yielding support to the upper part of the core and to compress or expand slightly in conformity with the movements of the core within the casing.

Moreover, in certain constructions it may be desired to dispense entirely with the cradle 24 and to connect the lower ends of the springs 20 directly with the core instead of with the cradle as in the preferred embodiment of the invention, and I have illustrated such a modified construction in Fig. 6 in which it will be noted that the sides of the core are provided with lugs 27' suitable for the attachment of the lower ends of the springs, these lugs being positioned on the sides of the core at a sufficient height above the bottom thereof to afford the requisite clearance above the ends of the transverse member 3". Under these conditions I prefer to make the lower part of the transverse member of such length that its ends will either contact with or lie closely adjacent the sides of the core so as to prevent any material amount of lateral play between the core and the casing in a manner similar to that in which such lateral play is prevented in the preferred embodiment of the invention by the engagement of the ends of the cradle with the ends of the transverse member.

It will thus be observed that in the several forms of my invention which I have herein described and illustrated, the core is yieldingly or resiliently supported in the casing in such manner as to be capable of a certain amount of relative movement with respect thereto, the weight of the core being supported by the springs either directly or through the medium of the cradle in such manner that twisting or deformation of the normal shape of the casing when the automobile is being driven over uneven surfaces is not communicated to the core and the latter thus relieved from shocks or jars with the possibility of resulting injury to its relatively delicate parts. Moreover, it will be evident that by removing the upper section of the casing the core may be readily withdrawn therefrom without, in the preferred embodiment of the invention, disturbing the assembled relation of the springs and cradle, thereby enabling a new core or such other parts as may be desired to be inserted with the minimum expenditure of time and labor; thus, for example, in case of damage to the core the old core may be removed and replaced by a new one either temporarily or permanently without necessity of replacing the whole radiator.

While I have herein described and illustrated certain typical embodiments of my invention to enable those skilled in the art to comprehend and practice the principles thereof, I do not thereby desire or intend to in any way limit myself to any particular or specific construction or detailed arrangement of the various parts, as the same may be suitably modified as desired and the invention embodied in radiators of types other than those shown or otherwise adapted for the various conditions encountered in practice without departing from the spirit and scope of the invention as defined in the appended claims.

Having thus described my invention, I claim and desire to protect by Letters Patent of the United States:

1. An automobile radiator comprising a rigid casing having separable sections one over the other, a core disposed in the casing and removable vertically therefrom upon the removal of the upper of said sections, springs disposed at each side of the core within the casing and connected at their upper ends thereto, and a cradle within said casing and arranged beneath the core and connected to the lower ends of the springs for yieldingly supporting said core in said casing.

2. An automobile rediator comprising a rigid casing having separable portions of channel section, a core disposed in said casing, a cradle adapted to receive the lower part of the core, and coil springs extending from said cradle to said casing and operative to yieldingly support said cradle and in turn said core within the casing.

3. An automobile radiator comprising a rigid casing having upper and lower sections each of channel section, a core arranged to partially extend within and slide vertically with respect to said casing in said channels, a cradle disposed beneath the core, and a pair of coil springs arranged at each side of the core and connected at their lower ends to said cradle, and means for supporting the upper ends of said springs from the casing.

4. An automobile radiator comprising a two-part casing having separable upper and lower sections, a core disposed in said casing and removable vertically therefrom upon the removal of said upper section, yielding means disposed between the upper part of said core and the upper part of the casing, a coil spring arranged at each side of the core, means for supporting the upper ends of said springs from the casing, and means for connecting the lower ends of said springs with the core so as to yieldingly support said core within the casing.

5. An automobile radiator comprising a casing having separable upper and lower sections, a core disposed within the casing and vertically removable therefrom upon the removal of the upper of said sections, a coil spring disposed at each side of the core and supported at one end from the casing and connected at the other end adjacent the core whereby the weight of the core is carried by the springs, and yielding cushioning means interposed between the core and the upper section of the casing and between said core and the lower section of said casing.

6. An automobile radiator comprising a casing having separable upper and lower sections, a core disposed in said casing, and removable therefrom vertically when the upper of said sections is removed, yielding means disposed between the upper part of said core and the upper part of said casing, a coiled spring arranged on each side of said core, means for supporting the upper ends of said springs from said casing, means for connecting the lower ends of said springs with said core so as to yieldingly support said core within the casing, and a soft cushion between the lower part of said core and the lower part of said casing.

In witness whereof, I have hereunto set my hand this 24th day of October, 1922.

HERMAN Z. CUTLER.